(12) United States Patent
Sunderland (10) Patent No.: US 12,188,588 B2
(45) Date of Patent: Jan. 7, 2025

(54) SECURING BRACKET

(71) Applicant: Gripple Limited, Sheffield (GB)

(72) Inventor: Oliver Sunderland, Sheffield (GB)

(73) Assignee: GRIPPLE LIMITED (GB)

(*) Notice: Subject to any disclaimer, the term of this patent is extended or adjusted under 35 U.S.C. 154(b) by 172 days.

(21) Appl. No.: 17/598,523

(22) PCT Filed: Apr. 23, 2020

(86) PCT No.: PCT/IB2020/053850
§ 371 (c)(1),
(2) Date: Sep. 27, 2021

(87) PCT Pub. No.: WO2020/222092
PCT Pub. Date: Nov. 5, 2020

(65) Prior Publication Data
US 2022/0146019 A1    May 12, 2022

(30) Foreign Application Priority Data

May 2, 2019   (GB) ..................................... 1906149
Apr. 7, 2020  (GB) ..................................... 2005128

(51) Int. Cl.
*F16L 3/04* (2006.01)
*F16L 3/12* (2006.01)
(Continued)

(52) U.S. Cl.
CPC ............... *F16L 3/04* (2013.01); *F16L 3/1218* (2013.01); *F16L 3/23* (2013.01); *H02G 3/32* (2013.01)

(58) Field of Classification Search
CPC .. F16L 3/04; F16L 3/1218; F16L 3/23; H02G 3/32
See application file for complete search history.

(56) References Cited

U.S. PATENT DOCUMENTS

| | | | |
|---|---|---|---|
| 1,365,060 A | | 1/1921 | Pleister |
| 2,162,340 A | * | 6/1939 | Peterman .................. F16L 3/04 248/74.5 |

(Continued)

FOREIGN PATENT DOCUMENTS

| | | |
|---|---|---|
| DE | 20305948 U1 | 6/2003 |
| DE | 202004002037 U1 | 4/2004 |

(Continued)

OTHER PUBLICATIONS

European Examination Report dated Jan. 23, 2024.

*Primary Examiner* — David M Upchurch
(74) *Attorney, Agent, or Firm* — Clark Hill PLC; James R. Foley (57) ABSTRACT

A securing bracket (10) comprises a fastening arrangement (18) at which the securing bracket (10) can be fastened to a support (12). The securing bracket (10) further includes an array (26) of further arrangements of the securing bracket (10). The array (26) comprises a holding arrangement (28) for holding an article (14) against the support (12), and an urging arrangement to urge the holding arrangement (28) towards the support (12). The securing bracket (10) comprises an elongate member (16) shaped into said fastening arrangement (18) and said array (26). A further securing bracket (110) comprises a fastening arrangement (18) at which the securing bracket (110) can be fastened to a support (12) and a holding arrangement (28) for holding an article (14). The holding arrangement (28) comprises a coil. The further securing bracket (110) comprises an elongate member (116) shaped into said fastening arrangement (18) and said holding arrangement (28).

18 Claims, 12 Drawing Sheets

(51) Int. Cl.
   *F16L 3/23* (2006.01)
   *H02G 3/32* (2006.01)

(56) References Cited

U.S. PATENT DOCUMENTS

| | | | | |
|---|---|---|---|---|
| 3,012,745 | A * | 12/1961 | Donovan | F16B 5/125 |
| | | | | 24/339 |
| 3,263,026 | A | 7/1966 | Kihs | |
| 6,135,397 | A * | 10/2000 | Santa Cruz | F16L 55/035 |
| | | | | 248/302 |
| 6,364,266 | B1 | 4/2002 | Garvin | |
| 7,726,619 | B2 * | 6/2010 | Lien | F16B 35/06 |
| | | | | 248/302 |
| 8,286,928 | B2 * | 10/2012 | Lien | F16B 45/00 |
| | | | | 248/303 |
| 8,746,640 | B2 * | 6/2014 | Broadley | F16M 13/02 |
| | | | | 248/220.21 |
| 2005/0056764 | A1 | 3/2005 | Thompson | |
| 2006/0059842 | A1 * | 3/2006 | McCafferty Babcock | |
| | | | | E04C 5/163 |
| | | | | 52/649.8 |
| 2015/0276093 | A1 * | 10/2015 | Aotani | H02G 3/32 |
| | | | | 248/72 |
| 2017/0045159 | A1 | 2/2017 | Billimack | |

FOREIGN PATENT DOCUMENTS

| | | |
|---|---|---|
| DE | 102004007373 A1 | 11/2004 |
| EP | 2924834 A2 | 9/2015 |
| JP | 2016161027 A | 9/2016 |
| WO | 2017211797 A1 | 12/2017 |

* cited by examiner

SECURING BRACKET

This invention relates to securing brackets. More particularly, but not exclusively, this invention relates to securing brackets for securing cables. Embodiments of the invention relate to cable securing brackets.

It is often necessary to secure cables to surfaces, such as walls, ceilings or the like. This can be done by the use of trunking or clips. However, many known securing products are not able to withstand the effects of a fire.

According to a general aspect of this invention, there is provided a securing bracket comprising: a fastening arrangement at which the securing bracket can be fastened to a support; and a holding arrangement for holding an article; wherein the securing bracket comprises an elongate member bent into said fastening arrangement and said holding arrangement.

According to one aspect of this invention, there is provided a securing bracket comprising: a fastening arrangement at which the securing bracket can be fastened to a support; and an array of further arrangements of the securing bracket, the array comprising a holding arrangement for holding an article against the support; and an urging arrangement to urge the holding arrangement towards the support; wherein the securing bracket comprises an elongate member bent into said fastening arrangement and said array.

According to another aspect of this invention, there is provided a securing bracket comprising: a fastening arrangement at which the securing bracket can be fastened to a support; and a holding arrangement for holding an article, the holding arrangement comprising a coil; wherein the securing bracket comprises an elongate member bent into said fastening arrangement and said holding arrangement According to another aspect of this invention, there is provided a method of securing an article, wherein the method comprises: providing a securing bracket as described in the immediately preceding paragraph; fastening the securing bracket to a support at the fastening arrangement; and arranging the article so that it is held by the holding formation.

The article may be an elongate article, such as a cable, wire, wire rope or the like. The securing bracket is suitable for securing an article in the form of a cable, for example an electrical cable.

The method may comprise securing the article to a support. The article may be held between the holding formation and the support. Alternatively, the article may be held within the coil.

The securing bracket may be a cable securing bracket. The article to be secured may be a cable. The cable securing bracket may secure one or more cables to the support. The securing bracket may be fastened to a surface of the support.

The support may have a surface to which the securing bracket can be fastened. The surface may be a planar surface. The support may be, for example, a wall, ceiling, desk or floor.

The elongate member may be formed as a single piece. The elongate member may be formed of a malleable material. The elongate member may be formed of a metal, such as steel. The elongate member may be a wire.

The urging arrangement may extend transverse to the fastening arrangement. The fastening arrangement may comprise a receiving portion, through which a fastener can be received. The receiving portion may define a hole. The receiving portion may be a loop portion. The elongate member may be bent to form said loop portion.

The method may comprise inserting the fastener through the receiving portion into the support. The fastener may be a screw, bolt or a nail.

The fastening arrangement may further include a connecting portion between the urging arrangement and the loop portion. The elongate member may be bent to form said connecting portion. The connecting portion may be substantially straight.

The urging arrangement may comprise a substantially U-shaped portion of said elongate member. The urging arrangement may be arranged between the fastening arrangement and the holding arrangement.

The urging arrangement may be resilient to allow the holding arrangement to be moved away from the support and facilitate the article being arranged between the holding arrangement and the support. The method may comprise moving the holding arrangement away from the support and inserting the article between the holding arrangement and the support.

The urging arrangement may have a first arm extending to the fastening arrangement. The urging arrangement may have a second arm extending to the holding arrangement. The first arm may be longer than the second arm. The urging arrangement may have a curved region between the first and second arms.

The holding arrangement may extend from said urging arrangement. The holding arrangement may comprise a gripping portion for gripping the article. The gripping portion may be substantially straight. The elongate member may be bent to form said gripping portion. The method may comprise moving the gripping portion away from the support and inserting the article between the gripping portion and the support.

The fastening arrangement may define a plane. The holding arrangement may be arranged out of said plane. Thus, in use of the embodiments described herein, the gripping portion is spaced from the support.

The holding arrangement may further include a retaining portion for retaining the article between the gripping portion and the support. The elongate member may be bent to form said retaining portion. The retaining portion may be substantially V bent, having an apex and two arms. The apex may be arranged to engage the support.

In a first embodiment, the securing bracket may include two of said arrays. Each of said arrays may extend in a respective opposite direction from the fastening arrangement.

In a second embodiment, the securing bracket may have only one of said arrays. Said array may extend in one direction from the fastening arrangement. In the second embodiment, the fastening arrangement may be provided at one end of the securing bracket. The urging and holding arrangements may extend on one side of the fastening arrangement.

Alternatively, where the holding arrangement comprises a coil, the coil may include a main portion and an overlapping portion. The overlapping portion may be arranged to overlap the main portion. The coil may comprise greater than one turn of the elongate member. The coil may comprise between 1 and 1.5 turns of the elongate member. The coil may comprise substantially 1.25 turns of the elongate member.

The coil may be connected directly to the fastening arrangement. In one embodiment, the securing bracket may be devoid of an urging arrangement between the fastening arrangement and the coil.

Embodiments of the invention will now be described by way of example only, with reference to the accompanying drawings, in which.

Referring to FIGS. 1 to 9 of the drawings, there is shown a securing bracket 10, in the form of a cable securing bracket. The securing bracket 10 can be attached to a planar surface of a support 12 such as a wall, ceiling, desk or floor. The purpose of the securing bracket 10 is to secure articles 14 against the support 12. In the embodiments described herein, the articles 14 used with the securing bracket 10 are elongate articles, which may be cables, such as electrical cables. The securing bracket 10 allows the articles to be strung through a building in a manner that is simple and quick to install.

The securing bracket 10 shown in FIGS. 1 to 9 comprises a single elongate member 16 in the form of a length of wire formed of a malleable material, such as a metal. The securing bracket 10 comprises a fastening arrangement 18 at which the securing bracket 10 can be fastened to the support 12 by means of a fastener 20, such as a bolt or screw (see FIGS. 7 to 9). The fastening arrangement 18 comprises a loop portion 22, which defines an hole 24 through which the fastener 20 can extend into the support 12. The loop portion 22 is formed by shaping the elongate member 16 so that it defines the hole 24.

The securing bracket 10 further includes two arrays 26 extending from the fastening arrangement 18 in opposite directions. Each of the arrays 26 comprises a holding arrangement 28 for gripping the article 14 against the support 12, and a resilient urging arrangement 30 to urge the holding arrangement 28 towards the support 12. The arrays 26 are formed by shaping the elongate member 16 into each of the two arrays 26.

The fastening arrangement 18 further includes a connecting portion 32 extending between the urging arrangement 30 and the loop portion 22. In the embodiment shown, the connecting portion 32 is substantially straight, but it could be any other configuration, for example curved. The connecting portion 32 connects the urging arrangement 30 of each array 26 to the loop portion 22. The urging arrangement 30 of each array 26 is arranged between the fastening arrangement 18 and the holding arrangement 28.

Each urging arrangement 30 extends transverse to the respective fastening arrangement 18, and comprises a substantially U-shaped portion 34 of said elongate member 16.

Each urging arrangement 30 is resiliently flexible to allow the respective holding arrangement 28 to be moved away from the support 12 thereby allowing the article 14 to be inserted easily between the holding arrangement 28 and the support 12.

Each urging arrangement 30 has first and second arms 36, 38, and a curved region 40 extending between the first and second arms 36, 38. The first arm 36 extends from the curved region 40 to the connecting portion 32. The second arm 38 extends from the curved region 40 to the holding arrangement 28. The first arm 36 is longer than the second arm 38. This difference in length of the arms spaces the holding arrangement 28 away from the support 12 in use.

The holding arrangement 28 of each array 26 extends from the respective urging arrangement 30, and comprises a substantially straight gripping portion 42 for gripping the article 14. The gripping portion 42 extends from the second arm 38 of the urging arrangement 30.

Each holding arrangement 28 further includes a retaining portion 44 for retaining the article 14 between the gripping portion 42 and the support 12. The retaining portion 44 extends from one end of the gripping portion 42. The retaining portion 44 is substantially V shaped, having an apex 46 and two arms 48, 50, the arm 48 being attached to the gripping portion 42. In use, the apex 46 and the fastening arrangement 18 engage the support 12.

Figure 1:
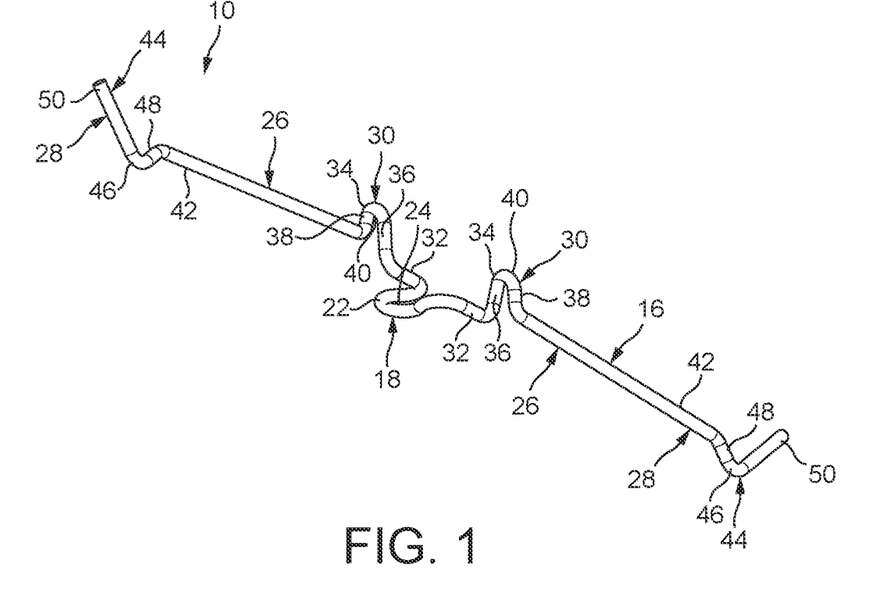
FIGS. 1 to 6 are views from various angles of a securing bracket.
Figure 2:
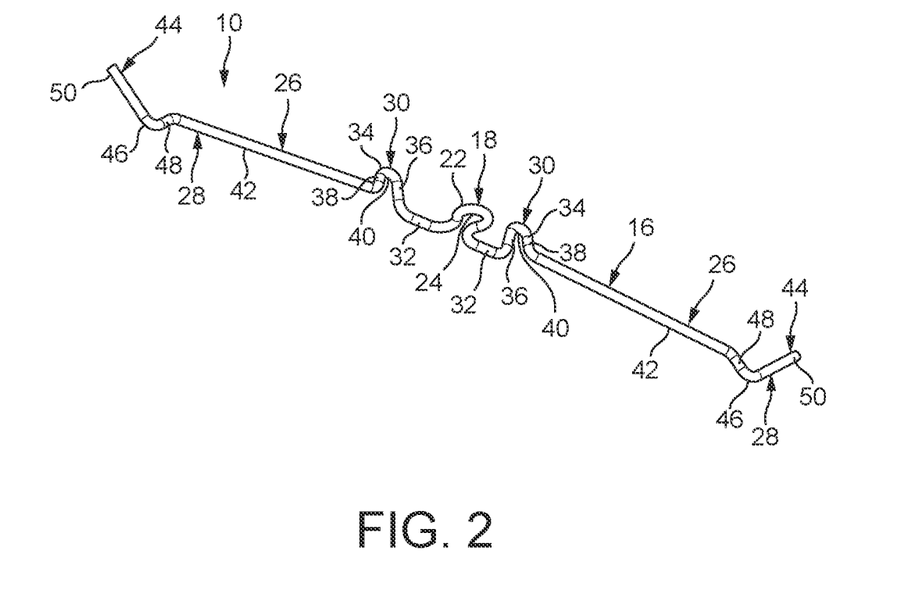
Figure 3:
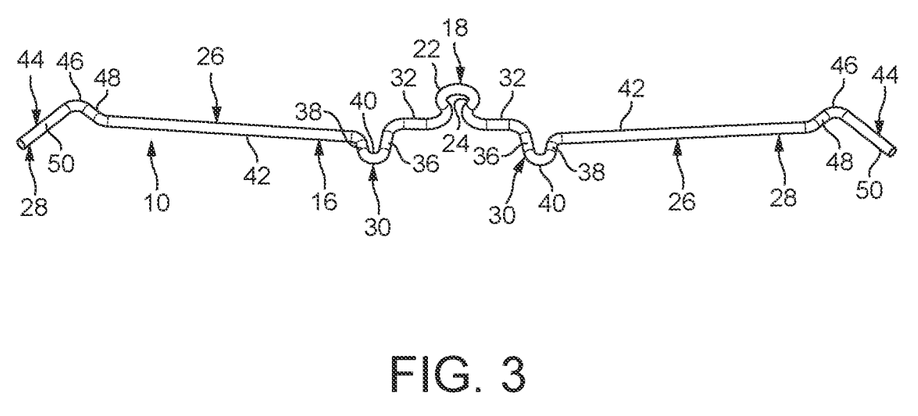
Figure 4:
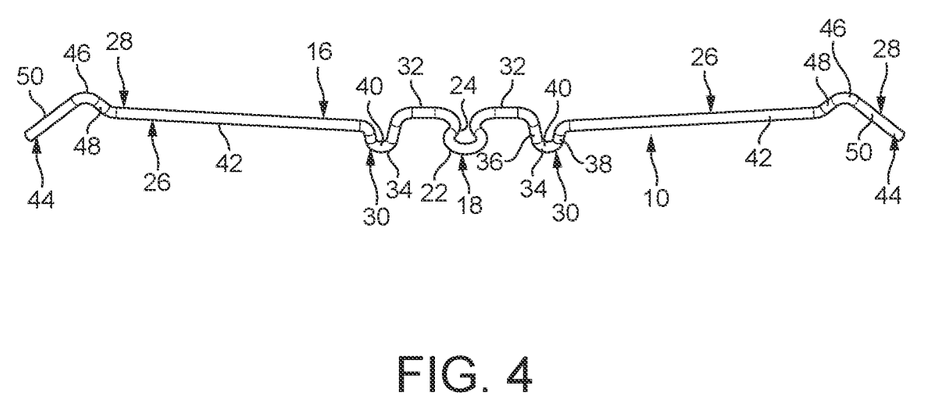
Figure 5:
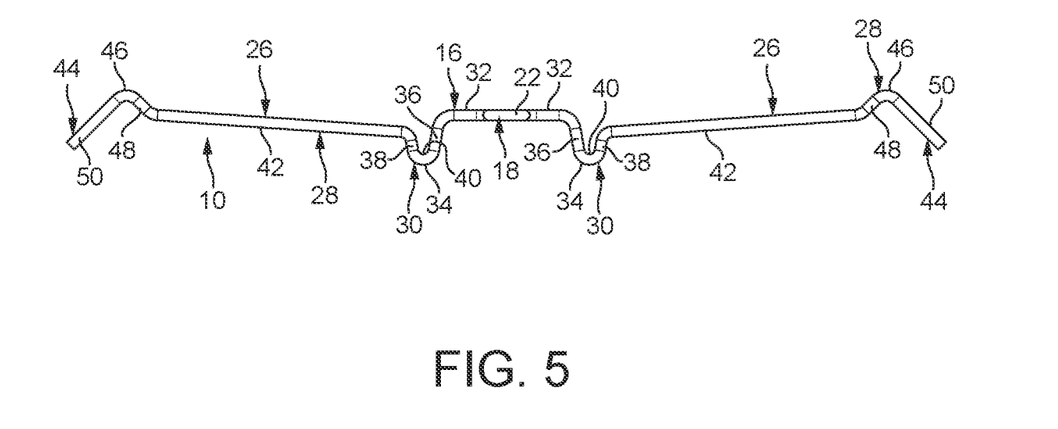
Figure 6:
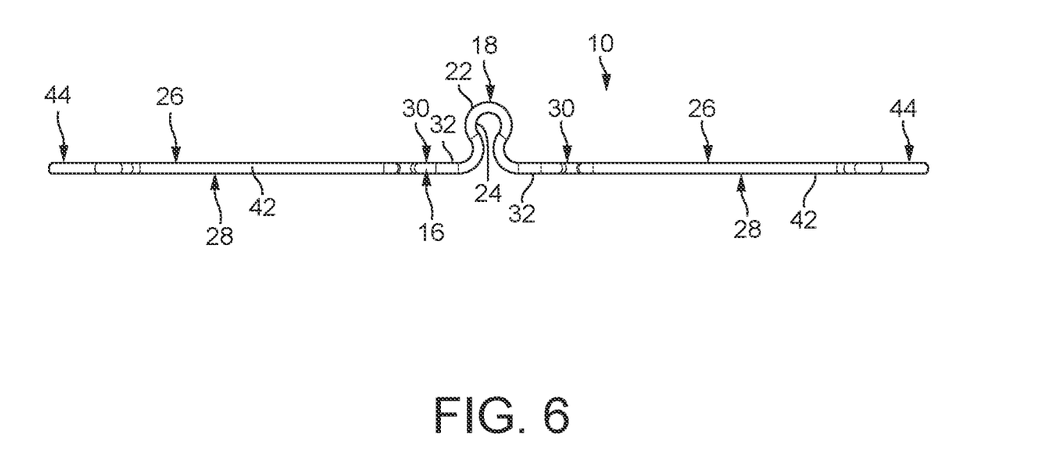
Figure 7:
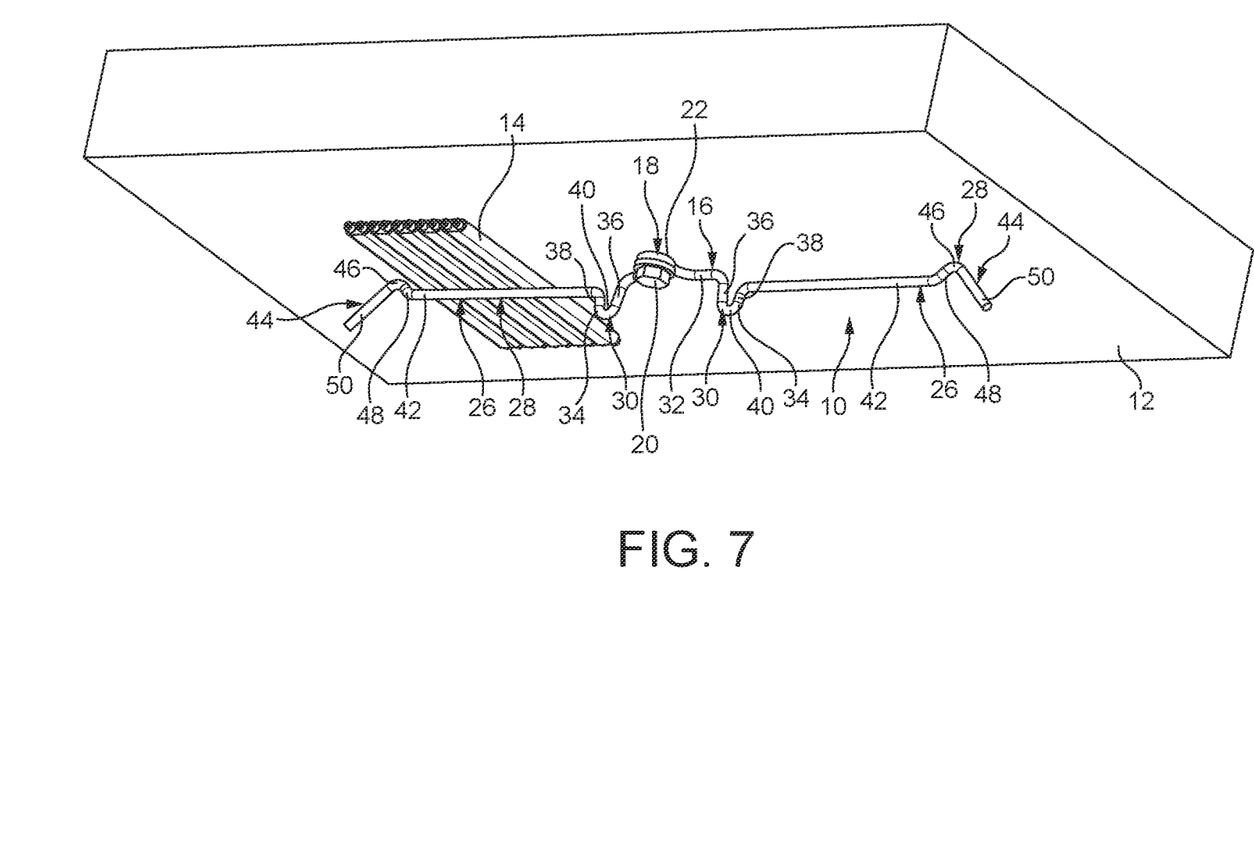
FIG. 7 is a perspective view of the securing bracket in use on a ceiling.
Figure 8:
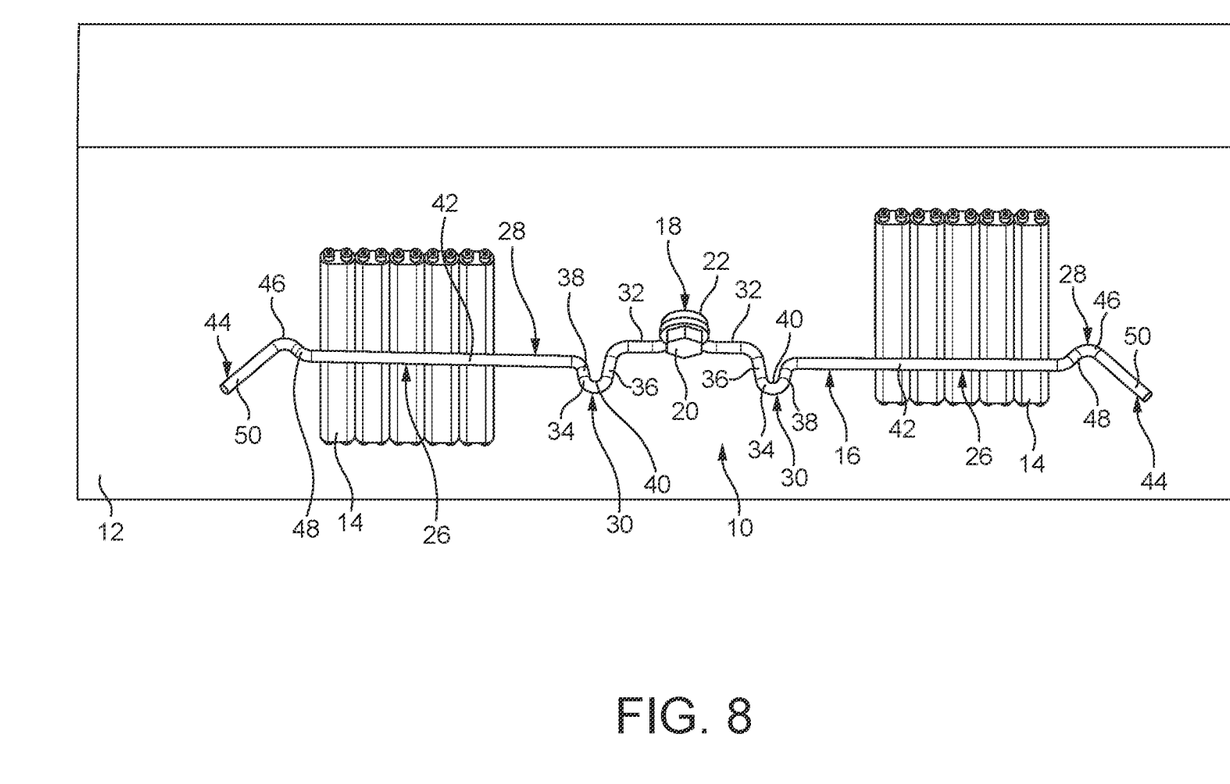
FIG. 8 is a further perspective view of the securing bracket in use on a ceiling.
Figure 9:
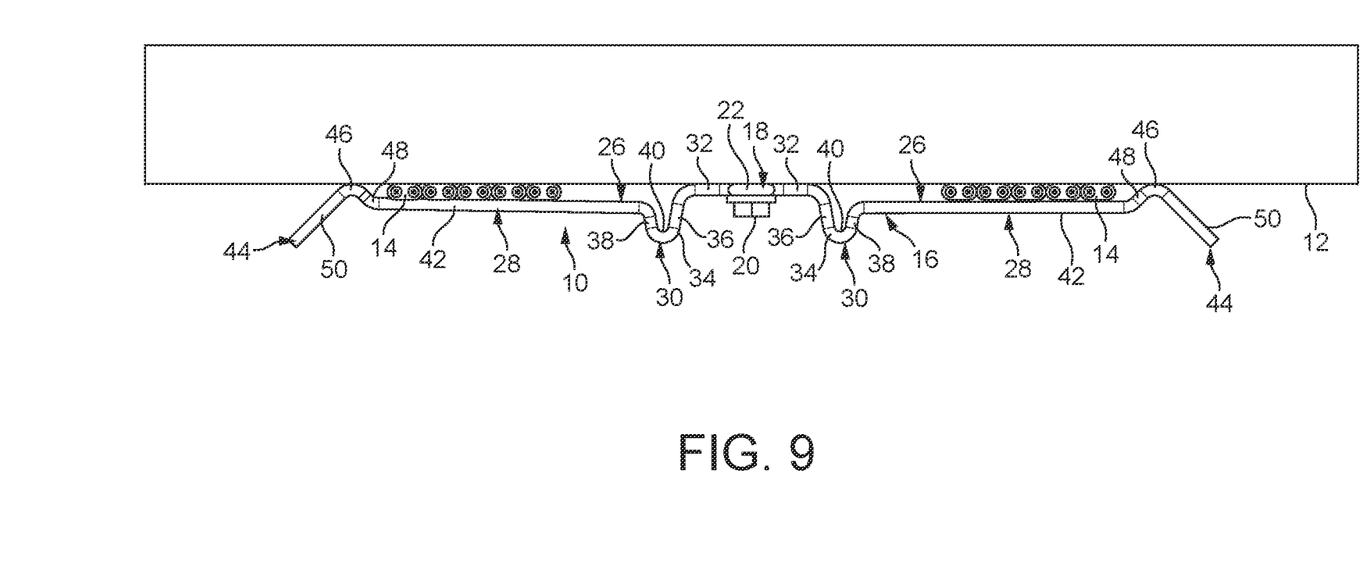
FIG. 9 is a plan view of the securing bracket in use on a ceiling.

In use, the securing bracket 10 is fastened to the support 12 in a position as shown in FIGS. 7 to 9, by inserting the fastener 20 through the hole 24 defined by the loop portion 22 and screwed into the support 12. When the securing bracket 10 is so fastened to the support 12, the fastening arrangement 18 and the apex 46 of each retaining portion 44 engage the support 12 and thereby space the gripping portion 42 from the support 12.

The gripping portion 42 of each array 26 is moved away from the support 12, thereby creating a gap between the respective retaining portion 44 and the support 12. The articles 14 are slid through the gaps into the regions between the gripping portions 42 and the support 12.

Each gripping portion 42 is then moved back so that the respective retaining portion 44 engages the support 12. In this position, each gripping portion 42 engages the articles 14, which are thereby gripped between the gripping portions 42 and the support 12.

Figure 10:
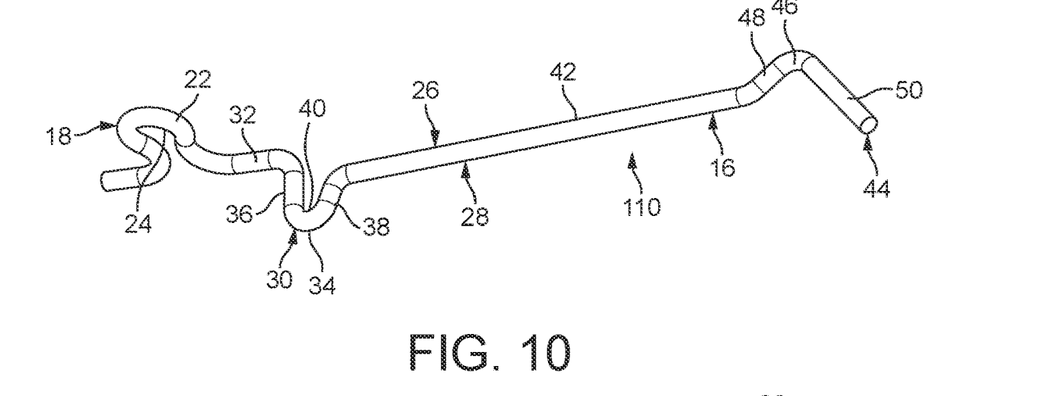
FIGS. 10 to 12 are views from various angles of a modified securing bracket.
Figure 11:
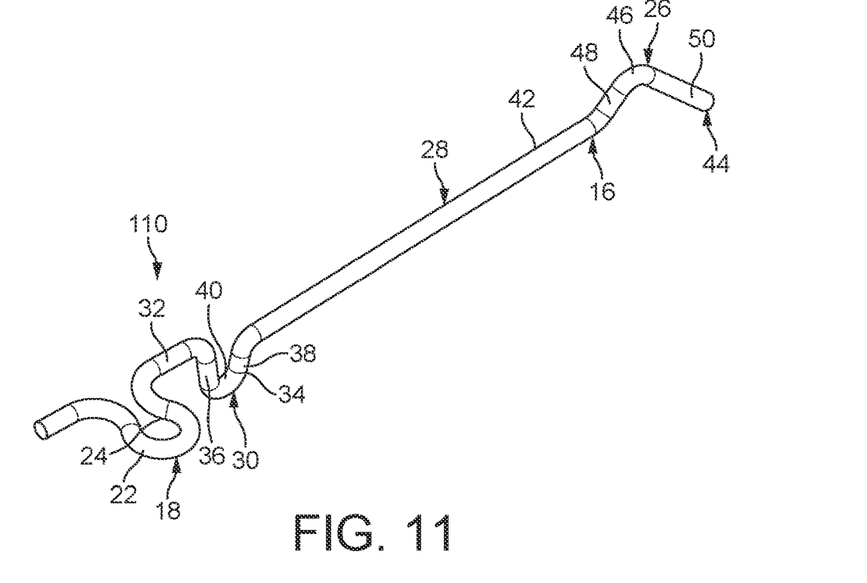
Figure 12:
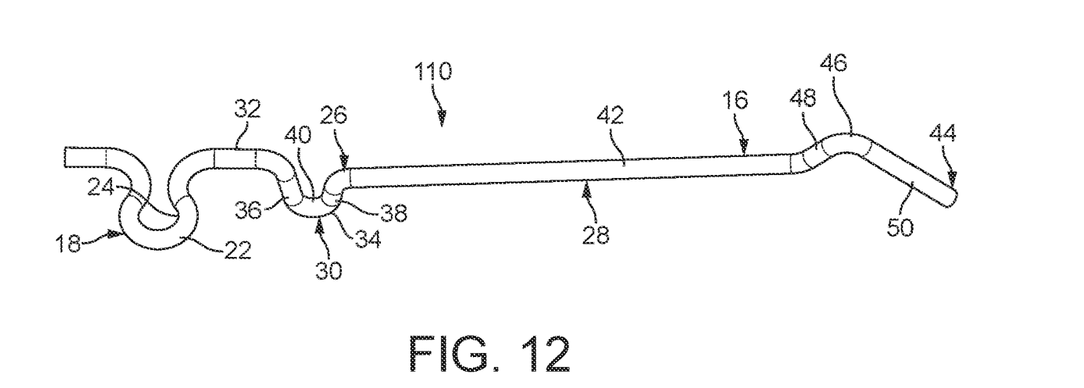

Referring to FIGS. 10 to 12, a further securing bracket is shown which comprises many of the features of the securing bracket 10 shown in FIGS. 1 to 9. These features in FIGS. 10 to 12 are designated with the same reference numerals as the corresponding features in FIGS. 1 to 9.

The securing bracket 110 differs from the securing bracket 10 in that the securing bracket 110 possesses only one of the arrays 26 comprising the urging arrangement 30 and the holding arrangement 28. The array 26 of the securing bracket 110 comprises the same features as each of the arrays 26 shown in FIGS. 1 to 9 and is used in the same way. The fastening arrangement 18 and the single array 26 are formed from an elongate member 16 bent into the fastening arrangement 18 and the array 26.

There are thus described two embodiments of a securing bracket 10, 110 used to secure articles 14, such as electrical cables to a wall or a ceiling. Each of the securing brackets 10, 110 is formed from an elongate member 16 bent into the fastening arrangement 18 and the, or each, array 26.

Various modifications can be made without departing from the scope of the invention.

Reference is now made to FIGS. 13 to 18, in which a further securing brackets, generally designated 110 are shown. The securing bracket 110 comprises a single elongate member 112 in the form of a length of wire formed of a malleable material, such as a metal.

Each of the securing brackets 110 comprises a fastening arrangement 18, which is the same as the fastening arrangement 18 described above and shown in FIGS. 1 to 12. The fastening arrangement 18 shown in FIGS. 13 to 18 has the same features as the fastening arrangement 18 shown in FIGS. 1 to 12. These features have been designated in FIGS. 13 to 18 with the same reference numerals as the corresponding features in FIGS. 1 to 12.

Figure 13:
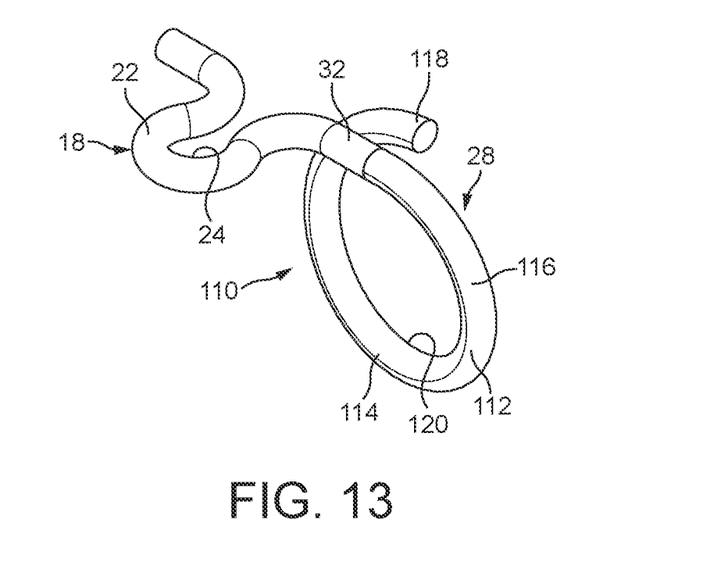
FIG. 13 shows a further securing bracket.
Figure 14:
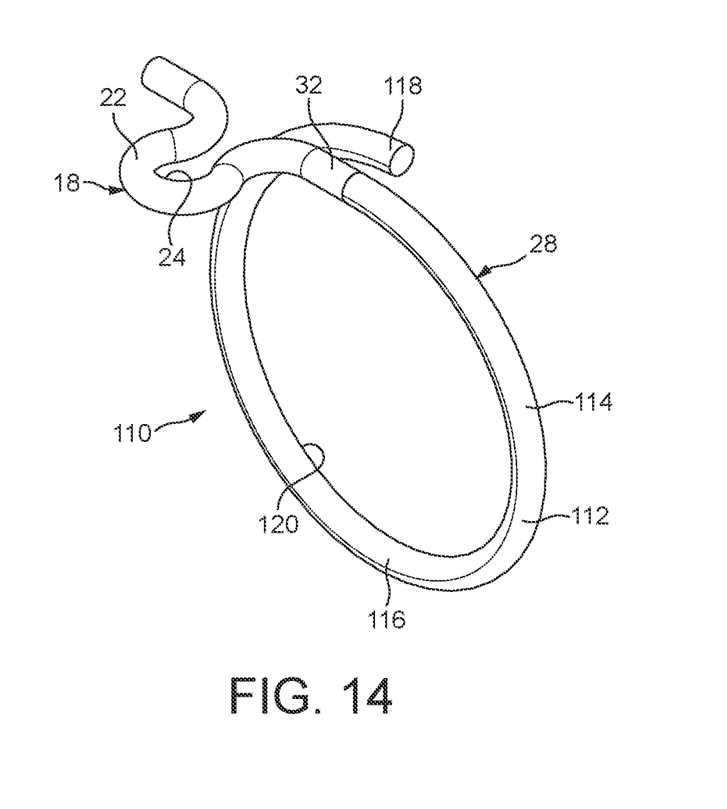
FIG. 14 shows a modified version of the further securing bracket.

The holding arrangement 28 of the further securing bracket 110 comprises a coil 114 which is connected to the fastening arrangement 18 by the connecting portion 32. The coil 114 is formed of 1.25 turns of the elongate member 112, and comprises a main portion 116 and an overlapping portion 118. The main portion 116 defines a circular space 120. The overlapping portion 118 overlaps the main portion 116 at the connecting portion 32, and helps to prevent the articles 14 from being inadvertently dislodged from the coil 114.

In use, a plurality of the securing brackets 110 are fastened to a support 12, for example a ceiling, by screwing respective fasteners 20 through the holes 24 into the support 12. The securing brackets 110 are secured to the support 12 in a line, so that the coils 114 are aligned with each other. A plurality of the articles 14 are then threaded through the circular spaces 120 to be supported by the securing brackets 110.

Figure 15:
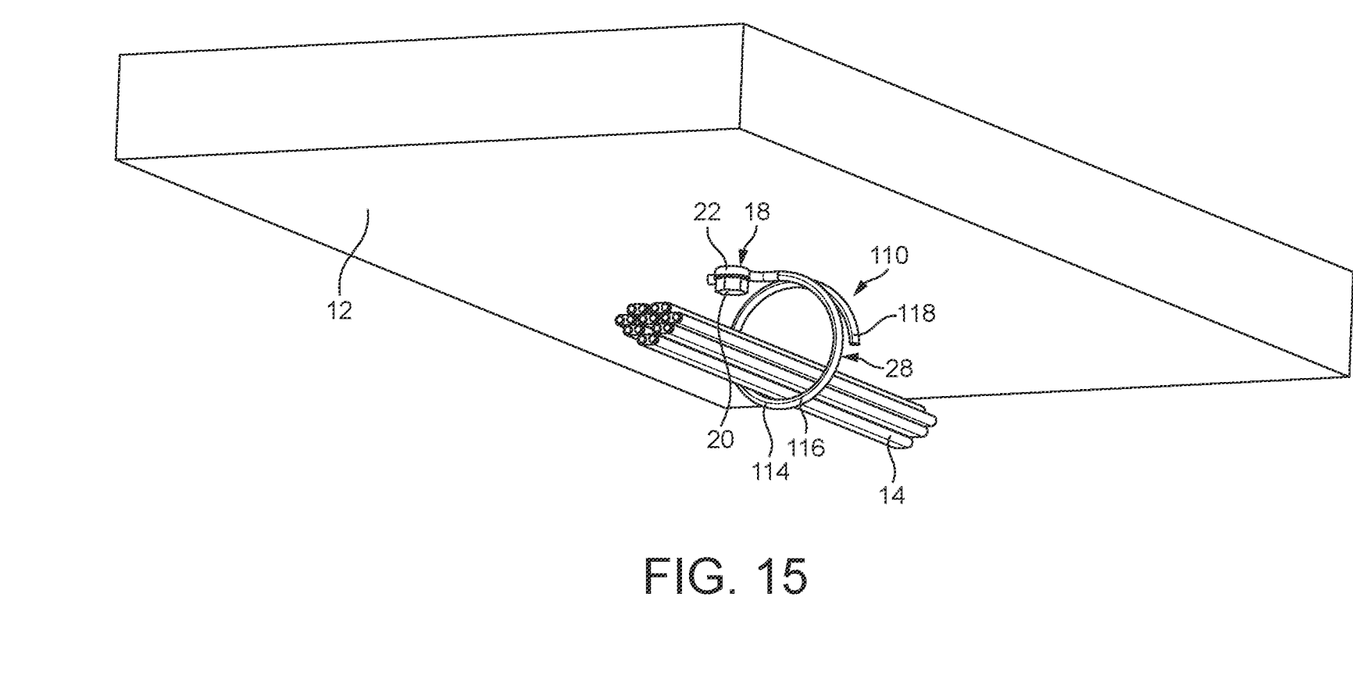
FIGS. 15 to 17 are views from various angles of the further securing bracket shown in FIG. 14 fastened to a ceiling.
Figure 16:
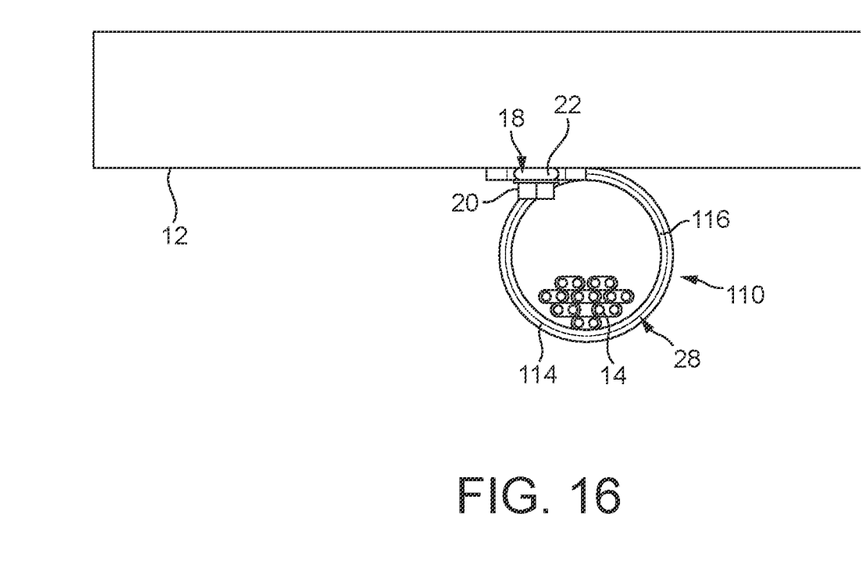
Figure 17:
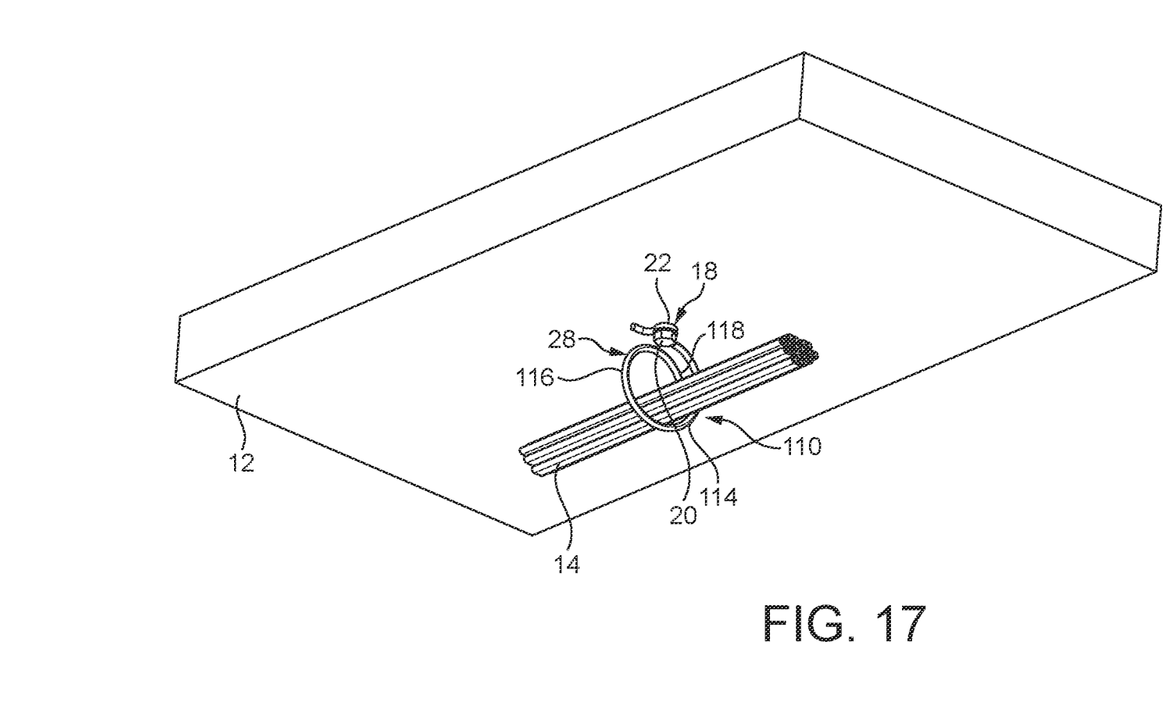
Figure 18:
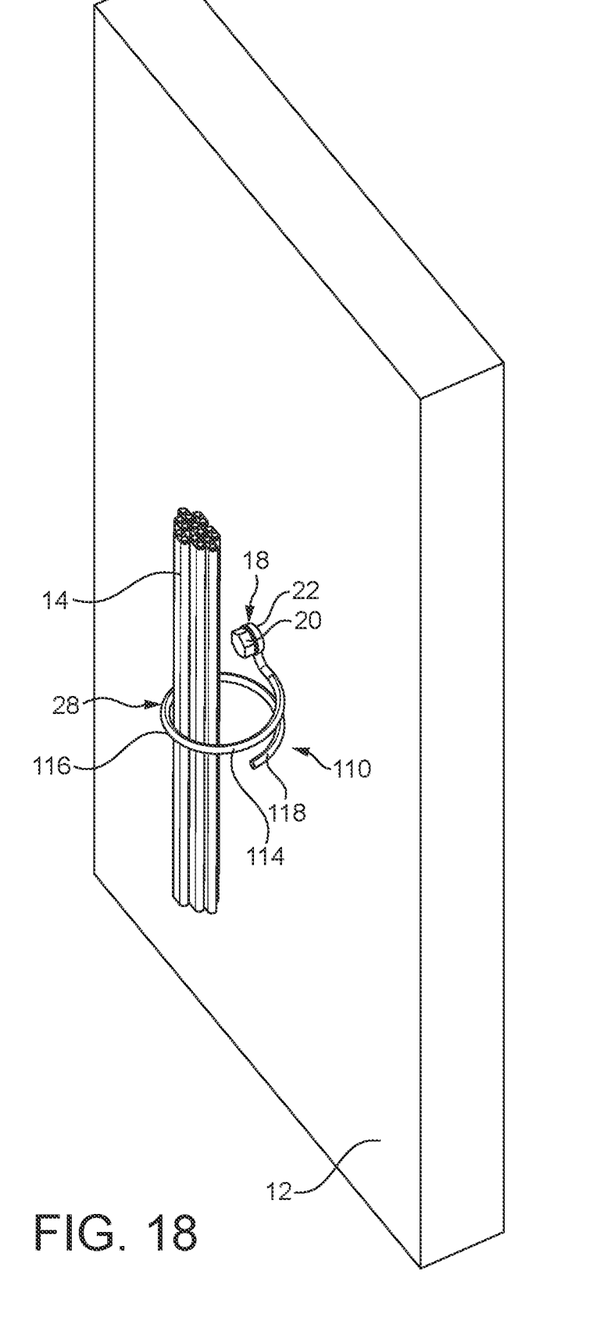
FIG. 18 is a perspective view of the further securing bracket shown in FIG. 14 attached to a wall.

FIGS. 15 to 17 show the use of the securing bracket 110 on a horizontal support 12, such as a ceiling. It is also possible to use the securing brackets 110 on a vertical support 12, such as a wall. An example of the securing bracket 110 in use on a vertical support 12 is shown in FIG. 18.

The invention claimed is:

1. A securing assembly comprising a securing bracket, an article and a support, wherein the securing bracket comprises an elongate member bent to form:
   a fastening region comprising a first region of the elongate member, wherein the securing bracket is fastened to the support at said first region;
   a holding region of the elongate member, wherein said holding region holds the article; and
   an urging region of the elongate member, wherein the urging region comprises a substantially U-shaped portion of said elongate member to urge the holding region towards the support, so that the holding region holds the article against the support; and
   wherein the holding region comprises a gripping portion formed of a single segment of said holding region, and the holding region further includes a retaining portion for retaining the article between the gripping portion and the support;
   wherein the gripping portion is provided between the urging region and the retaining portion; and
   the article is arranged between the gripping portion and the support.

2. A securing assembly according to claim 1, wherein the elongate member comprises a wire formed of a malleable material.

3. A securing assembly according to claim 1, wherein the urging region extends transverse to the fastening region, and the fastening region comprises a receiving portion through which a fastener can be received.

4. A securing assembly according to claim 3, wherein the receiving portion comprises a loop portion defining a hole, the elongate member being bent to form said loop portion.

5. A securing assembly according to claim 1, wherein the urging region is arranged between the fastening region and the holding region.

6. A securing assembly according to claim 1, wherein the urging region is resilient to allow the holding region to be moved away from the support and facilitate the article being arranged between the holding region and the support.

7. A securing assembly according to claim 1, wherein the urging region has first and second arms, the first arm extending to the fastening region, and the second arm extending to the holding region, and the urging region has a curved region between the first and second arms.

8. A securing assembly according to claim 1, wherein the gripping portion is substantially straight.

9. A securing assembly according to claim 8, wherein the elongate member is bent to form said gripping portion.

10. A securing assembly according to claim 8, wherein the fastening region defines a plane, and the holding region is arranged out of said plane.

11. A securing assembly according to claim 1, wherein the retaining portion is substantially V shaped, having an apex and two arms, the apex being arranged to engage the support.

12. A securing assembly according to claim 1, comprising two arrays of regions of the securing bracket, each of said arrays comprising the holding region and the urging region, and each of said arrays extending in a respective opposite direction from the fastening region.

13. A securing assembly according to claim 1, wherein the securing bracket has no more than one array of regions of the securing bracket, said array comprising the holding region and the urging region, and said array extending in one direction from the fastening region.

14. A securing assembly according to claim 13, wherein the fastening region is provided at one end of the securing bracket, the urging and holding regions extending on one side of the fastening region.

15. A securing assembly according to claim 1, wherein the holding region comprises a coil.

16. A securing assembly according to claim 15, wherein the fastening region comprises a loop portion defining a hole, through which a fastener can be received, the elongate member being bent to form said loop portion.

17. A securing assembly according to claim 15, wherein the coil comprises a main portion and an overlapping portion, the overlapping portion being arranged to overlap the main portion.

18. A securing bracket comprising:
   a fastening region at which the securing bracket can be fastened to a support; and
   an array comprising a holding region for holding an article and an urging region to urge the holding region towards the support, so that the holding region holds the article against the support;
   the urging region comprising a substantially U-shaped portion of said elongate member;
   wherein the securing bracket comprises an elongate member formed into said fastening region and said array by bending said elongate member;
   wherein the holding region comprises a gripping portion, and the holding region further includes a retaining portion for retaining the article between the gripping portion and the support; and
   wherein the gripping portion is provided between the urging region and the retaining portion.

* * * * *